US012313988B2

(12) United States Patent
Tanaka et al.

(10) Patent No.: US 12,313,988 B2
(45) Date of Patent: May 27, 2025

(54) DEVELOPING DEVICE AND IMAGE FORMING APPARATUS

(71) Applicant: FUJIFILM BUSINESS INNOVATION CORP., Tokyo (JP)

(72) Inventors: Arichika Tanaka, Kanagawa (JP); Yutaka Kiuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/432,254

(22) Filed: Feb. 5, 2024

(65) Prior Publication Data

US 2025/0102959 A1 Mar. 27, 2025

(30) Foreign Application Priority Data

Sep. 26, 2023 (JP) ................................ 2023-163964

(51) Int. Cl.
*G03G 15/04* (2006.01)
*G03G 15/08* (2006.01)
*G03G 21/16* (2006.01)

(52) U.S. Cl.
CPC ..... *G03G 15/0896* (2013.01); *G03G 15/0872* (2013.01); *G03G 21/1676* (2013.01)

(58) Field of Classification Search
CPC ........... G03G 15/0872; G03G 15/0896; G03G 21/1676
USPC ................................ 399/107, 110, 111, 119
See application file for complete search history.

(56) References Cited

U.S. PATENT DOCUMENTS

| | | | | |
|---|---|---|---|---|
| 5,089,849 | A | 2/1992 | Hiraoka | |
| 11,573,523 | B2 * | 2/2023 | Wan | G03G 21/1814 |
| 11,669,038 | B2 * | 6/2023 | Kawakami | G03G 21/1647 399/119 |
| 2005/0191089 | A1 | 9/2005 | Nishimura | |
| 2020/0319589 | A1 * | 10/2020 | Takahashi | G03G 21/206 |
| 2021/0271199 | A1 | 9/2021 | Tanaka | |

FOREIGN PATENT DOCUMENTS

| | | | |
|---|---|---|---|
| CN | 107132737 | * | 10/2020 |
| EP | 1 522 906 | A1 | 4/2005 |
| JP | 4655569 | B2 | 3/2011 |

OTHER PUBLICATIONS

Jul. 10, 2024 Extended European Search Report issued in European Patent Application No. 24156329.5.

* cited by examiner

*Primary Examiner* — Hoan H Tran
(74) *Attorney, Agent, or Firm* — Oliff PLC

(57) ABSTRACT

A developing device includes: an image carrier unit including an image carrier; a developing unit including a developer holder that supplies developer to the image carrier on which an electrostatic latent image is formed; a support unit that supports the developing unit such that the developing unit is movable back and forth toward and away from the image carrier unit; a first positioning unit provided on an end portion of the support unit, the end portion being adjacent to the image carrier unit, the first positioning unit positioning the developing unit; and a second positioning unit that positions the developing unit with a predetermined gap provided between the developer holder and the image carrier when the developing unit is positioned by the first positioning unit and leans toward the image carrier unit.

18 Claims, 14 Drawing Sheets

DEVELOPING DEVICE AND IMAGE FORMING APPARATUS

CROSS-REFERENCE TO RELATED APPLICATIONS

This application is based on and claims priority under 35 USC 119 from Japanese Patent Application No. 2023-163964 filed Sep. 26, 2023.

BACKGROUND

(i) Technical Field

The present disclosure relates to a developing device and an image forming apparatus.

(ii) Related Art

An electrophotographic image forming apparatus includes an image carrier unit including an image carrier, and a developing unit including a developer holder. To provide an accurate interval (hereinafter referred to as a "clearance") between the image carrier and the developer holder, the image carrier unit and the developing unit are abutted against each other so that the developing unit is positioned and fixed. The image forming apparatus according to the related art is structured such that the developing unit is pressed against the image carrier unit by its own weight to prevent variations in the clearance due to a reaction force generated while a developing member is driven or an external force applied by another component of the image forming apparatus.

Japanese Patent No. 4655569 describes an image forming apparatus including a developing-member support member that is restrained from moving in an up-down direction and movable in a left-right direction; a pressing-force generating member that presses the developing member against a photoconductor drum; and a tracking mechanism that maintains a distance between the photoconductor drum (image carrier) and a developing roller (developer holder) at a predetermined distance while a pressing force is applied by the pressing-force generating member. When a photoconductor tracking member and a developing-roller tracking member included in the tracking mechanism are in contact with each other, a center position of a photoconductor unit is at a height equal to or lower than a height of the developing roller, so that the developing-roller tracking member presses the photoconductor tracking member from above.

SUMMARY

A large image forming apparatus includes a large developing member, and therefore a large reaction force is generated when the developing member is driven. Accordingly, a complex mechanism is used to press the developing member against the photoconductor drum against the reaction force generated when the developing member is driven.

Aspects of non-limiting embodiments of the present disclosure relate to a structure for generating a pressing force for pressing the developing member against the photoconductor drum, the structure being simpler than a structure including a member for generating a pressing force for pressing the developing member against the photoconductor drum.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a developing device including: an image carrier unit including an image carrier; a developing unit including a developer holder that supplies developer to the image carrier on which an electrostatic latent image is formed; a support unit that supports the developing unit such that the developing unit is movable back and forth toward and away from the image carrier unit; a first positioning unit provided on an end portion of the support unit, the end portion being adjacent to the image carrier unit, the first positioning unit positioning the developing unit; and a second positioning unit that positions the developing unit with a predetermined gap provided between the developer holder and the image carrier when the developing unit is positioned by the first positioning unit and leans toward the image carrier unit.

BRIEF DESCRIPTION OF THE DRAWINGS

An Exemplary embodiment of the present disclosure will be described in detail based on the following figures, wherein:

FIG. 5A illustrates a front support structure for a lower support roller, FIG. 5B illustrates a rear support structure for the lower support roller, FIG. 5C illustrates a front support structure for an upper support roller, and FIG. 5D illustrates a rear support structure for the upper support roller;

FIG. 6A illustrates a front region and FIG. 6B illustrates a rear region;

FIG. 7A illustrates the front region and FIG. 7B illustrates the rear region;

FIG. 8A illustrates the front region and FIG. 8B illustrates the rear region;

FIG. 9A illustrates the front region and FIG. 9B illustrates the rear region;

FIG. 11A illustrates a first state and FIG. 11B illustrates a second state;

FIG. 12A illustrates a third state and FIG. 12B illustrates a fourth state;

FIG. 13A illustrates a fifth state and FIG. 13B illustrates a sixth state; FIG. 14A illustrates a seventh state and FIG. 14B illustrates an eighth state.

DETAILED DESCRIPTION

An exemplary embodiment of the present disclosure will now be described in detail with reference to the accompanying drawings.

Structure of Image Forming Apparatus

Figure 1:
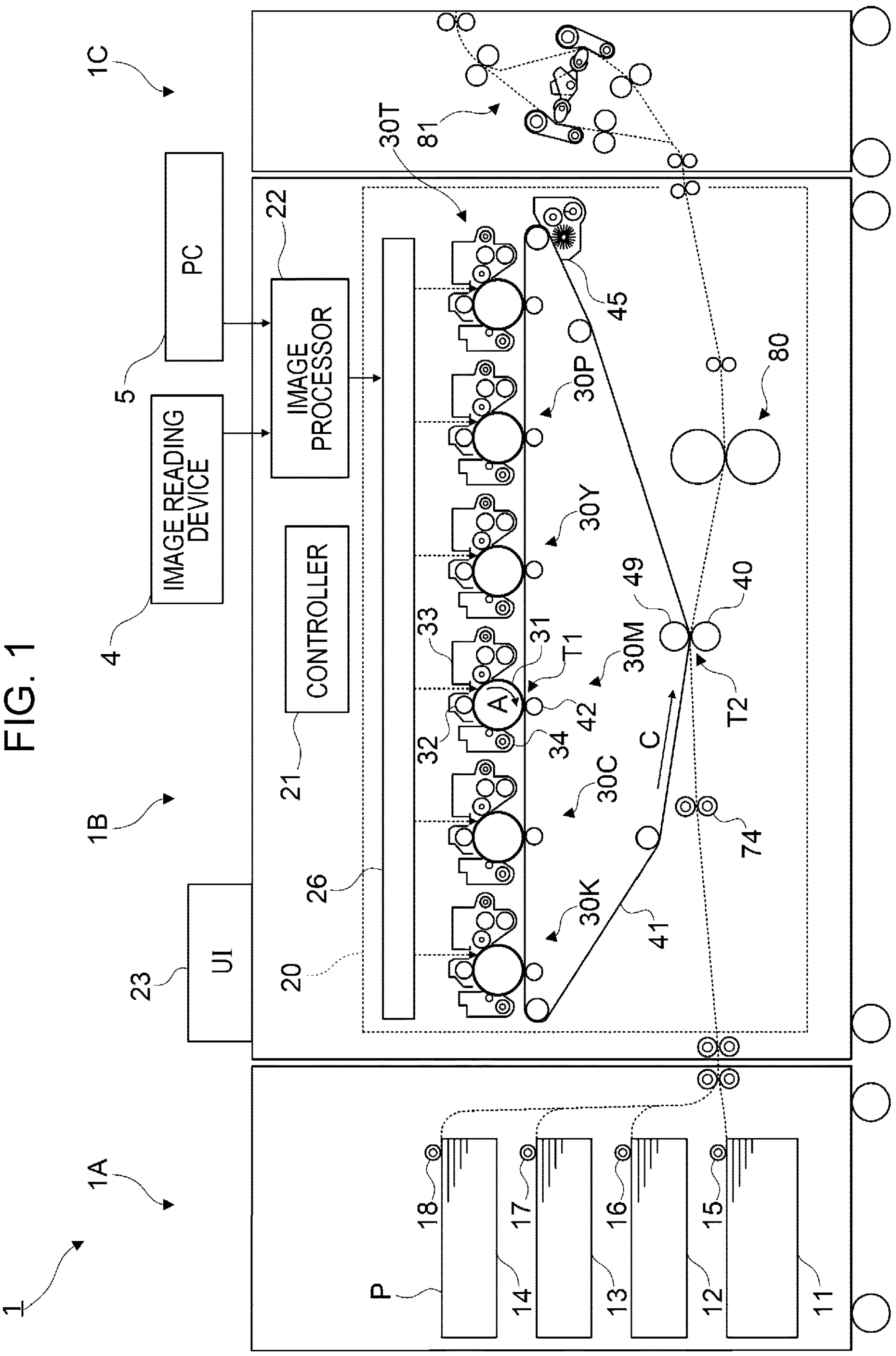
FIG. 1 illustrates an image forming apparatus to which an exemplary embodiment is applied.

FIG. 1 illustrates an image forming apparatus 1 to which the present exemplary embodiment is applied. The image forming apparatus 1 according to the present exemplary embodiment includes a paper feed unit 1A, a print unit 1B, and a paper output unit 1C. The paper feed unit 1A includes first to fourth paper storage members 11 to 14 that store paper sheets P serving as examples of recording media. The paper feed unit 1A includes feed rollers 15 to 18 provided for the first to fourth paper storage members 11 to 14, respectively, to deliver the paper sheets P stored in the respective paper storage members to a transport path connected to the print unit 1B.

The print unit 1B includes an image forming section 20 in which an image is formed on each paper sheet P. The print unit 1B also includes a controller 21 that controls components of the image forming apparatus 1. The print unit 1B also includes an image processor 22. The image processor 22 performs an image process on image data transmitted from an image reading device 4 or a personal computer (PC) 5. The print unit 1B also includes a user interface (UI) 23 composed of, for example, a touch panel for presenting information to a user and receiving information from the user.

The image forming section 20, which is an example of image forming means, includes six image forming units 30T, 30P, 30Y, 30M, 30C, and 30K (hereinafter sometimes referred to simply as "image forming units 30") arranged in parallel with uniform spacing therebetween. Each image forming unit 30 includes a photoconductor drum 31 on which an electrostatic latent image is formed while the photoconductor drum 31 rotates in the direction of arrow A; a charging roller 32 that charges a surface of the photoconductor drum 31; a developing member 33 that develops the electrostatic latent image formed on the photoconductor drum 31; and a drum cleaner 34 the removes toner and the like from the surface of the photoconductor drum 31.

The image forming section 20 also includes an exposure device 26 that exposes the photoconductor drum 31 of each image forming unit 30 to laser light. The light to which the photoconductor drum 31 is exposed by the exposure device 26 is not limited to laser light. For example, a light source, such as a light emitting diode (LED), may be provided for each image forming unit 30, and the photoconductor drum 31 may be exposed to light emitted from the light source.

The image forming units 30 have the same structure except for the toner contained in the developing members 33. The image forming units 30Y, 30M, 30C, and 30K respectively form yellow (Y), magenta (M), cyan (C), and black (K) toner images. The image forming units 30T and 30P form toner images using, for example, toner of a corporate color, foaming toner for printing Braille characters, toner of a fluorescent color, or toner used to improve glossiness. In other words, the image forming units 30T and 30P form toner images using toners of special colors.

The image forming section 20 also includes an intermediate transfer belt 41 to which the toner images of respective colors formed on the photoconductor drums 31 of the image forming units 30 are transferred. The image forming section 20 also includes first transfer rollers 42 that transfer the toner images of the respective colors formed by the image forming units 30 onto the intermediate transfer belt 41 in first transfer regions T1. The image forming section 20 also includes a second transfer roller 40 that simultaneously transfers the toner images transferred to the intermediate transfer belt 41 to the paper sheet P in a second transfer region T2. The image forming section 20 also includes a belt cleaner 45 that removes toners and the like from a surface of the intermediate transfer belt 41, and a fixing device 80 that fixes the images transferred to the paper sheet P in the second transfer process to the paper sheet P.

The image forming section 20 performs an image forming operation based on a control signal transmitted from the controller 21. More specifically, first, the image forming section 20 causes the image processor 22 to perform the image process on the image data received from the image reading device 4 or the PC 5 and supply the resulting image data to the exposure device 26. Then, in, for example, the magenta (M) image forming unit 30M, the charging roller 32 charges the surface of the photoconductor drum 31, and the exposure device 26 irradiates the photoconductor drum 31 with laser light modulated based on the image data obtained from the image processor 22.

Thus, an electrostatic latent image is formed on the photoconductor drum 31. The formed electrostatic latent image is developed by the developing member 33, so that a magenta toner image is formed on the photoconductor drum 31. Similarly, the image forming units 30Y, 30C, and 30K respectively form yellow, cyan, and black toner images, and the image forming units 30T and 30P form toner images of special colors.

The toner images of the respective colors formed by the image forming units 30 are successively electrostatically transferred to the intermediate transfer belt 41 rotating in the direction of arrow C in FIG. 1 by the first transfer rollers 42, so that the toner images are superposed on the intermediate transfer belt 41. The superposed toner images on the intermediate transfer belt 41 are transported toward the second transfer region T2 including the second transfer roller 40 and a backup roller 49 as the intermediate transfer belt 41 moves.

The paper sheet P is fed from, for example, the first paper storage member 11 by the feed roller 15, and then is transported to the position of the registration roller 74 along the transport path. The registration roller 74 supplies the paper sheet P to the second transfer region T2 at the time when the superposed toner images are transported to the second transfer region T2. The superposed toner images are simultaneously electrostatically transferred to the paper sheet P by a transferring electric field formed between the second transfer roller 40 and the backup roller 49 in the second transfer region T2.

After that, the paper sheet P to which the superposed toner images have been electrostatically transferred is transported to the fixing device 80. The fixing device 80 performs a fixing process in which the paper sheet P having the unfixed toner images formed thereon is heated and pressed so that the toner images are fixed to the paper sheet P. The paper sheet P that has undergone the fixing process passes through a paper straightening section 81 provided in the paper output unit 1C, and is transported to a paper stacking portion (not illustrated).

Structure of Developing Member 33

Figure 2:
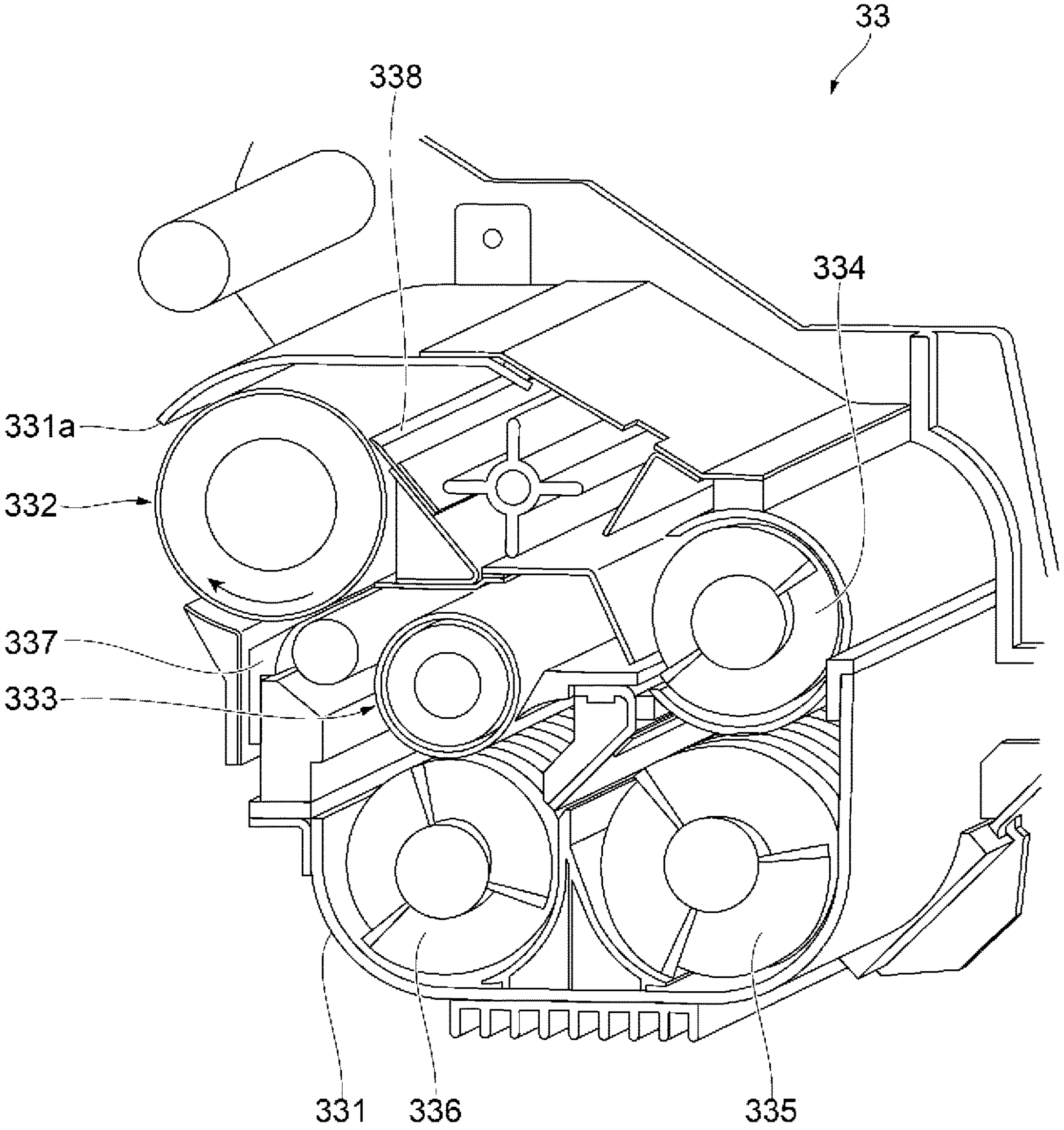
FIG. 2 illustrates the internal structure of a developing member.

FIG. 2 illustrates the internal structure of the developing member 33. FIG. 2 is a perspective view of the developing member 33 viewed in the direction from the front (near side of FIG. 1) to the rear (far side of FIG. 1) of the print unit 1B included in the image forming apparatus 1 illustrated in FIG. 1, and illustrates a sectional view taken at a location near the front end.

The developing member 33 includes an accommodating unit 331 disposed adjacent to the photoconductor drum 31 and composed of a housing extending in the front-to-rear direction of the print unit 1B. The accommodating unit 331 has an opening 331*a* at a position facing the photoconductor drum 31. The accommodating unit 331 accommodates a developing roller 332, a pick-up roller 333, a first transport unit 334, a second transport unit 335, a third transport unit 336, a regulating member 337, and a removal member 338 together with developer. The members accommodated in the accommodating unit 331 are elongated members having similar lengths, and are disposed substantially parallel to each other. The developer contained in the accommodating unit 331 is a mixture of toner used to form an image and carrier composed of magnetic particles for carrying the toner. The developing member 33 is an example of a developing unit.

The developing roller 332 includes a solid cylindrical shaft member and a hollow cylindrical sleeve that covers the shaft member. The developing roller 332 is disposed such that a side surface thereof is partially exposed at the opening 331*a* in the accommodating unit 331 and that the exposed surface faces the photoconductor drum 31. The shaft member of the developing roller 332 exerts a magnetic force, and the sleeve rotates around the shaft member in the direction shown by the arrow. The developing roller 332 causes the developer to adhere to the surface of the sleeve in response to the magnetic force of the shaft member, and rotates the sleeve to convey the developer to the opening 331*a*, so that the toner adheres to the charged photoconductor drum 31 to develop an electrostatic latent image. The developing roller 332 is an example of a developer holder.

The pick-up roller 333 is disposed adjacent and parallel to the developing roller 332. The pick-up roller 333 includes a solid cylindrical shaft member and a hollow cylindrical sleeve that covers the shaft member. The shaft member exerts a magnetic force, and the sleeve rotates around the shaft member. The pick-up roller 333 causes the developer to adhere to the surface of the sleeve in response to the magnetic force of the shaft member, and rotates the sleeve to convey and transfer the developer to the developing roller 332.

Each of the first transport unit 334, the second transport unit 335, and the third transport unit 336 is an auger having a helical blade around a rotating shaft. The first transport unit 334, the second transport unit 335, and the third transport unit 336 are disposed in the accommodating unit 331 such that rotating shafts thereof are parallel to the developing roller 332 and the pick-up roller 333. The first transport unit 334, the second transport unit 335, and the third transport unit 336 are rotated around the rotating shafts thereof so that the developer is stirred and transported in the directions along the rotating shafts of the transport units 334 to 336. The developer is transported along the first transport unit 334, the second transport unit 335, and the third transport unit 336 in that order as the first transport unit 334, the second transport unit 335, and the third transport unit 336 rotate, and is supplied from the third transport unit 336 to the pick-up roller 333.

The regulating member 337 is disposed downstream of the position at which the developing roller 332 faces the pick-up roller 333 and upstream of the position at which the developing roller 332 faces the photoconductor drum 31 along the side surface of the developing roller 332. Here, the terms "downstream" and "upstream" respectively refer to downstream and upstream in the direction in which the developing roller 332 rotates. The regulating member 337 levels off the developer supplied by the pick-up roller 333 and held on the surface of the developing roller 332 so that the height of the developer is constant. The developer removed by the regulating member 337 is collected in the accommodating unit 331 and returned to the transport path composed of the first transport unit 334, the second transport unit 335, and the third transport unit 336.

The removal member 338 is disposed downstream of the position at which the developing roller 332 faces the photoconductor drum 31 along the side surface of the developing roller 332. The term "downstream" refers to downstream in the direction in which the developing roller 332 rotates. The removal member 338 scrapes off the developer remaining on the surface of the developing roller 332 after the developer is supplied from the developing roller 332 to the photoconductor drum 31. The developer removed from the developing roller 332 by the removal member 338 is collected in the accommodating unit 331 and returned to the transport path composed of the first transport unit 334, the second transport unit 335, and the third transport unit 336.

Structure of Image Forming Unit 30

Figure 3:
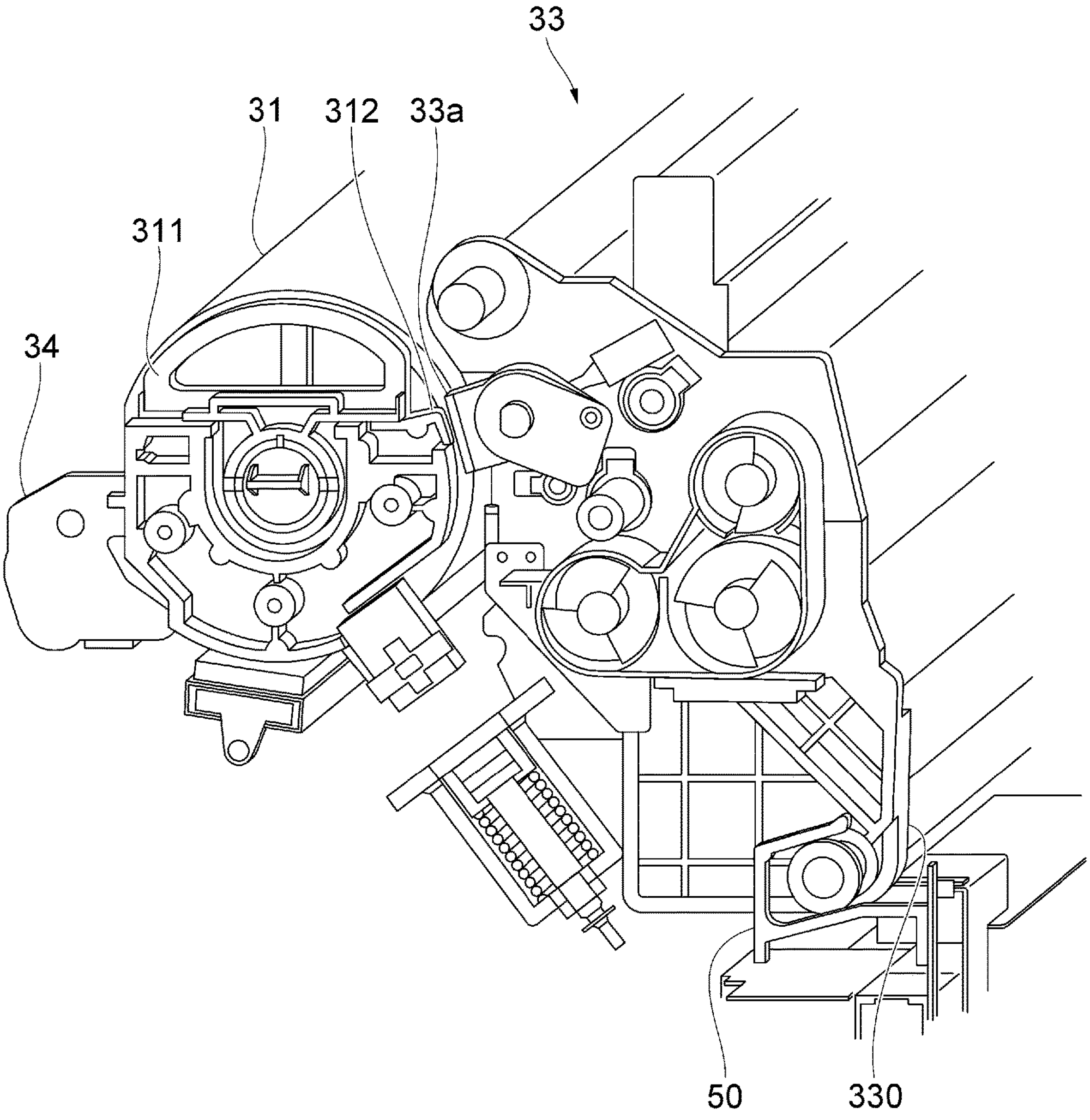
FIG. 3 illustrates the structure of an image forming unit.

FIG. 3 illustrates an example of the structure of each image forming unit 30. FIG. 3 illustrates the photoconductor drum 31, the developing member 33, and the drum cleaner 34, but does not illustrate the charging roller 32. The photoconductor drum 31, the developing member 33, the drum cleaner 34, and the charging roller 32 (not illustrated) extend in the front-to-rear direction of the print unit 1B.

As illustrated in FIG. 3, the photoconductor drum 31 and the developing member 33 are disposed adjacent to each other. More specifically, the photoconductor drum 31 and the developing member 33 are disposed so that axial directions of the photoconductor drum 31 and the developing roller 332 (see FIG. 2) of the developing member 33 are parallel and that a predetermined gap is provided between the surfaces of the photoconductor drum 31 and the developing roller 332. The gap between the photoconductor drum 31 and the developing roller 332 is, for example, 0.2 mm with a tolerance of about 30 m. The drum cleaner 34 is disposed to face the developing member 33 with the photoconductor drum 31 disposed therebetween.

The photoconductor drum 31 is rotatably supported at front and rear end portions by drum holders 311. Each of the front and rear drum holders 311 includes a contact support 312 used to position the developing member 33. FIG. 3 illustrates the contact support 312 included in the front drum holder 311. The photoconductor drum 31 and the drum holders 311 constitute an example of an image carrier unit. Although the contact support 312 is included in each of the front and rear drum holders 311, the contact support 312 may be included in only one of the front and rear drum holders 311.

The developing member 33 is supported by a frame 330. The frame 330 is composed of members including front and rear members, each of which includes a contact portion 33*a* corresponding to the contact support 312 of the drum holder 311. FIG. 3 illustrates the contact portion 33*a* provided at the front. As described in detail below, the developing member 33 is supported by the frame 330 and a portion of support member 50 positioned at the bottom of the developing member 33 such that the developing member 33 leans toward the photoconductor drum 31. Since the developing member 33 leans toward the photoconductor drum 31, the contact portion 33*a* abuts against the contact support 312 of the drum holder 311, so that the developing member 33 is positioned with respect to the photoconductor drum 31. The developing member 33 including the frame 330 is an example of a developing unit. The contact support 312 of the drum holder 311 and the contact portion 33*a* of the developing member 33 constitute an example a second positioning unit. In this example, the contact portion 33*a* is provided at both the front and rear of the frame 330; however, when the contact support 312 is provided only at the front or rear, the contact portion 33*a* may be provided only at the front or rear together with the contact support 312.

Support Structures for Developing Member 33

Figure 4:
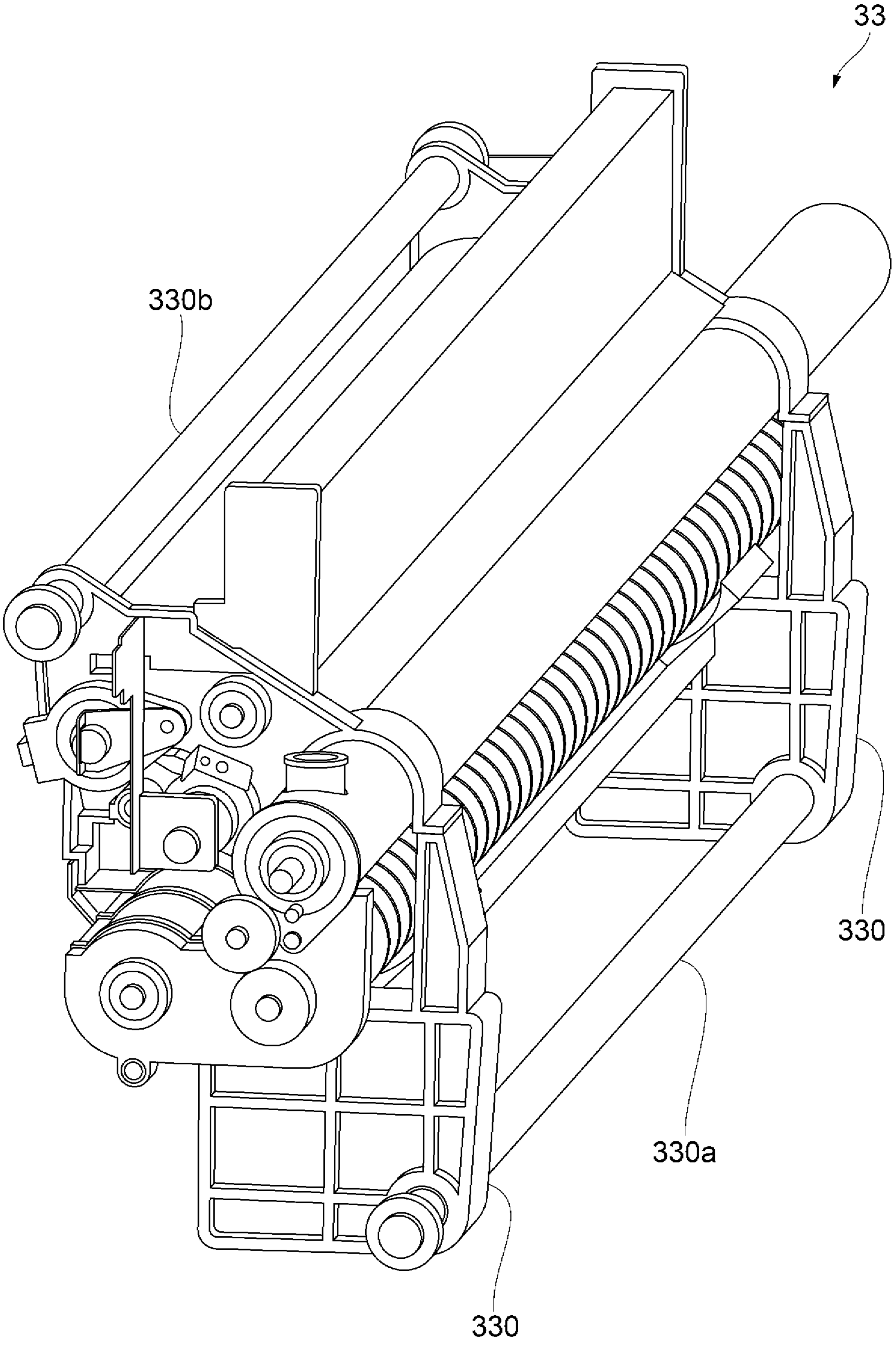
FIG. 4 illustrates the overall structure of the developing member.

FIG. 4 illustrates the overall structure of the developing member 33. Support rollers 330*a* and 330*b* for supporting the developing member 33 are respectively provided on lower and upper portions of the frame 330 that supports the developing member 33. The lower support roller 330*a* and the upper support roller 330*b* are placed on and supported by the support member 50 (see FIG. 3). As described in detail below, the support member 50 includes rails that support the lower support roller 330*a* and the upper support roller 330*b*. The support member 50 includes, for example, two rails for each of the lower support roller 330*a* and the upper support roller 330*b*, the two rails being disposed at the front and rear of the print unit 1B. The lower support roller 330*a* and the upper support roller 330*b* are placed on the rails of the support member 50 so that the developing member 33 is movable along the rails of the support member 50. The support member 50 is an example of a support unit.

In the illustrated example, when the print unit 1B is viewed from the front, the lower support roller 330*a* is disposed at a lower right location, and the upper support roller 330*b* is disposed at an upper left location. More specifically, when a side of the developing member 33 at which the developing member 33 faces the photoconductor drum 31 (see FIG. 3) is referred to as one side, the lower support roller 330*a* is closer to the other side than the center of gravity of the developing member 33. The upper support roller 330*b* is closer to the one side than the center of gravity of the developing member 33. The position of the upper support roller 330*b* is not limited to the position illustrated in FIG. 4 as long as the upper support roller 330*b* is capable of stably supporting the developing member 33 together with the lower support roller 330*a*. Since the lower support roller 330*a* and the upper support roller 330*b* are provided as described above, the developing member 33 leans toward the one side when the upper support roller 330*b* is separated from the rails and when the developing member 33 is supported only by the lower support roller 330*a* closer to the other side than the center of gravity.

Figure 5A:
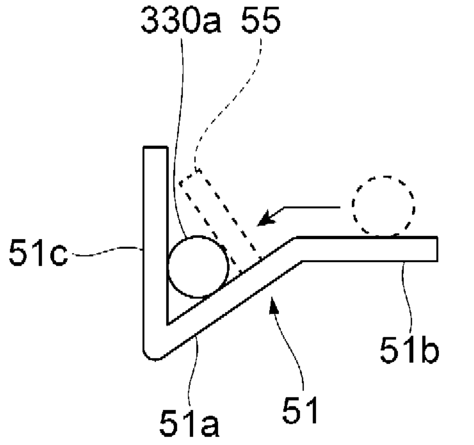
FIGS. 5A to 5D schematically illustrates a support structure for the developing member, where
Figure 5B:
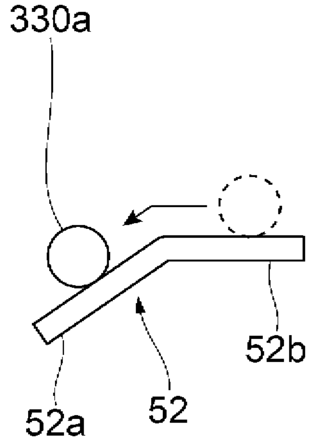
Figure 5C:
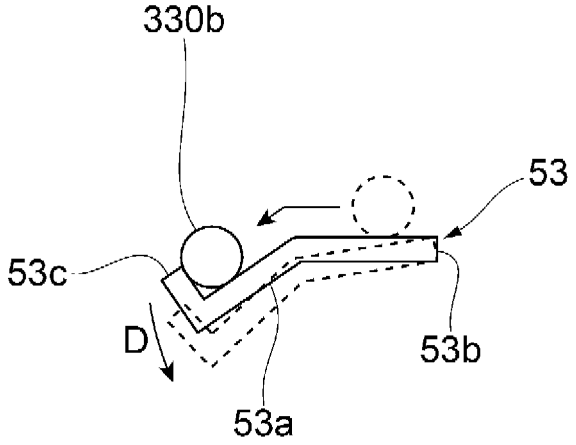
Figure 5D:
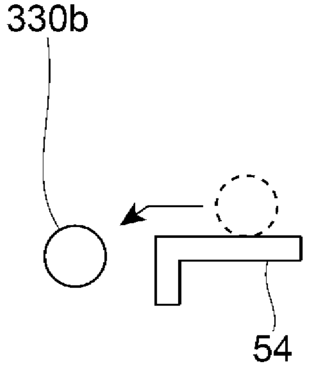

FIGS. 5A to 5D schematically illustrate support structures for the developing member 33, where FIG. 5A illustrates a front support structure for the lower support roller 330*a*, FIG. 5B illustrates a rear support structure for the lower support roller 330*a*, FIG. 5C illustrates a front support structure for the upper support roller 330*b*, and FIG. 5D illustrates a rear support structure for the upper support roller 330*b*. As illustrated in FIGS. 5A to 5D, the support member 50 includes one rail at each of the front and rear ends of the lower support roller 330*a*, and one rail at each of the front and rear ends of the upper support roller 330*b*. The rail at the front of the lower support roller 330*a* illustrated in FIG. 5A is referred to as a first lower support 51, the rail at the rear of the lower support roller 330*a* illustrated in FIG. 5B as a second lower support 52, the rail at the front of the upper support roller 330*b* illustrated in FIG. 5C as a first upper support 53, and a rail at the rear of the upper support roller 330*b* illustrated in FIG. 5D as a second upper support 54.

As illustrated in FIG. 5A, the first lower support 51 includes an inclined portion 51*a* inclined downward toward an end at one end thereof, and a substantially horizontal retracting portion 51*b* at the other end thereof. An abutting portion 51*c* extending upward is formed at the end of the inclined portion 51*a*. The lower support roller 330*a* placed on the first lower support 51 is on the inclined portion 51*a* (as shown by the solid line in FIG. 5A) during a normal image forming operation, and is retracted to the retracting portion 51*b* (as shown by the dashed line in FIG. 5A) when the developing member 33 is pulled out of the print unit 1B, for example, for replacement of the components or the developer.

When the lower support roller 330*a* is on the inclined portion 51*a*, the lower support roller 330*a* receives a force in a downward direction (toward the end) along the inclined portion 51*a* due to the weight of the developing member 33. The lower support roller 330*a* is positioned by being abutted against the abutting portion 51*c* at the end of the inclined portion 51*a*. To prevent the lower support roller 330*a* from moving backward in an upward direction along the inclined portion 51*a* due to, for example, vibration during the image forming process, a pressing member 55 is attached to the first lower support 51 while the lower support roller 330*a* is abutted against the abutting portion 51*c*, so that the movement of the lower support roller 330*a* is restrained by the pressing member 55.

As illustrated in FIG. 5B, the second lower support 52 includes an inclined portion 52*a* inclined downward toward an end at one end thereof, and a substantially horizontal retracting portion 52*b* at the other end thereof. The positions and lengths of the inclined portion 52*a* and the retracting portion 52*b* correspond to those of the inclined portion 51*a* and the retracting portion 51*b* of the first lower support 51 described above with reference to FIG. 5A. The lower support roller 330*a* placed on the second lower support 52 is on the inclined portion 52*a* (as shown by the solid line in FIG. 5B) during the normal image forming operation, and is retracted to the retracting portion 52*b* (as shown by the dashed line in FIG. 5B) when the developing member 33 is pulled out of the print unit 1B, for example, for replacement of the components or the developer.

Unlike the first lower support 51 including the abutting portion 51*c* and the pressing member 55, the second lower support 52 includes no structures for restraining the movement of the lower support roller 330*a*. Therefore, the lower support roller 330*a* is movable along the inclined portion 52*a* of the second lower support 52 in a normal operation. Thus, the lower support roller 330*a* is positioned simply by being placed on the second lower support 52, and is positioned more loosely by the second lower support 52 than by the first lower support 51. The reason for this is to prevent the developing member 33 from receiving an excessive physical load. In the normal operation, the developing member 33 is positioned at four locations by the contact supports 312 of the drum holders 311, the contact portions 33*a* of the frame 330 of the developing member 33, the first lower support 51, and the second lower support 52. When the position is fixed at all of the four locations, there is a possibility that the developing member 33 will receive an excessive physical load due to vibration or weight. Accordingly, the lower support roller 330*a* is loosely positioned by the second lower support 52 to reduce the load on the developing member 33. The first lower support 51 and the second lower support 52 constitute an example of a lower guide path and an example of a first positioning unit.

As illustrated in FIG. 5C, the first upper support 53 includes an inclined portion 53*a* inclined downward toward an end at one end thereof, and a substantially horizontal retracting portion 53*b* at the other end thereof. A support tab 53*c* projecting upward is formed at the end of the inclined portion 53*a*. The upper support roller 330*b* placed on the first upper support 53 is moved to the inclined portion 53*a* (as shown by the solid line in FIG. 5C) when the developing member 33 is set at a position for the normal image forming operation. The upper support roller 330*b* is retracted to the retracting portion 53*b* (as shown by the dashed line in FIG. 5C) when the developing member 33 is pulled out of the print unit 1B, for example, for replacement of the components or the developer.

As shown by the dashed lines in FIG. 5C, the first upper support 53 is structured such that the inclined portion 53*a* and the support tab 53*c* are retractable in a downward direction. More specifically, for example, a rotating shaft (not illustrated) is provided at the bottom of the retracting portion 53*b*, and the first upper support 53 is rotated around the rotating shaft in the direction of arrow D to be retracted. When the first upper support 53 is retracted downward, the upper support roller 330*b* is separated from the first upper support 53. As described in detail below, in the normal image forming operation, the first upper support 53 is retracted after the upper support roller 330*b* is placed on the inclined portion 53*a*. In the following description, the first upper support 53 is referred to as being in a first state when the upper support roller 330*b* is in contact with the inclined portion 53*a* of the first upper support 53, and in a second state when the first upper support 53 is retracted and separated from the upper support roller 330*b*.

As illustrated in FIG. 5D, the second upper support 54 includes a substantially horizontal portion. The position and length of the second upper support 54 correspond to those of the retracting portion 53*b* of the first upper support 53 described above with reference to FIG. 5C. Therefore, when the developing member 33 is pulled out of the print unit 1B, for example, for replacement of the components or the developer, the upper support roller 330*b* is placed on the second upper support 54 (as shown by the dashed line in FIG. 5D). When the developing member 33 is set at the position for the normal image forming operation, the upper support roller 330*b* is separated from the second upper support 54 (as shown by the solid line in FIG. 5D). The first upper support 53 and the second upper support 54 constitute an example of an upper guide path.

Operation of Setting Developing Member 33

Figure 6A:
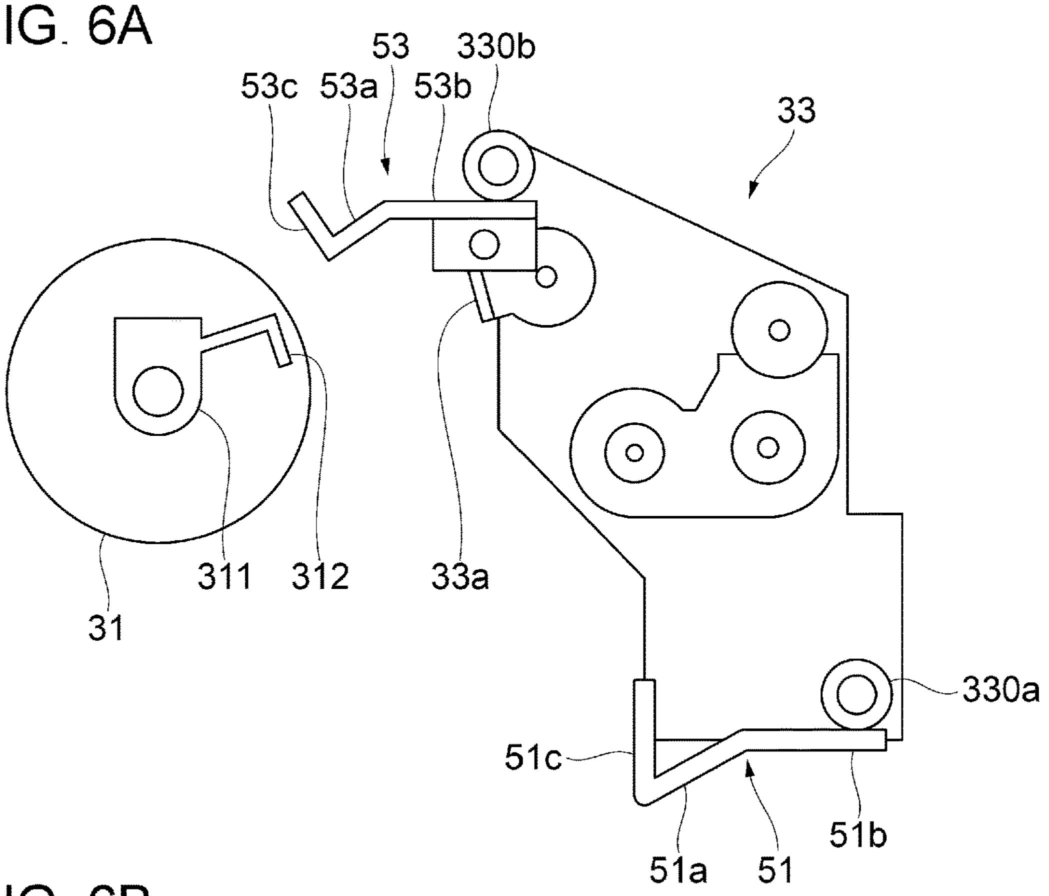
FIGS. 6A and 6B illustrate the developing member in a retracted state, where
Figure 7A:
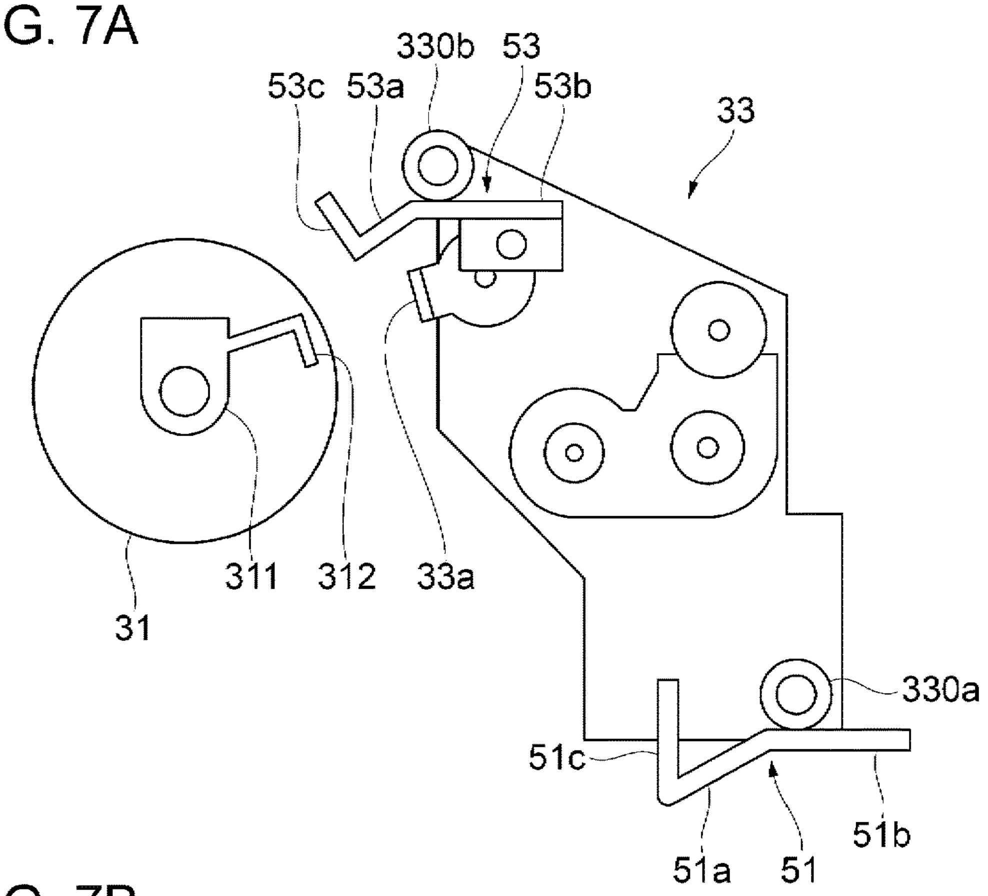
FIGS. 7A and 7B illustrate the developing member being moved from a retracted position to a set position, where
Figure 7B:
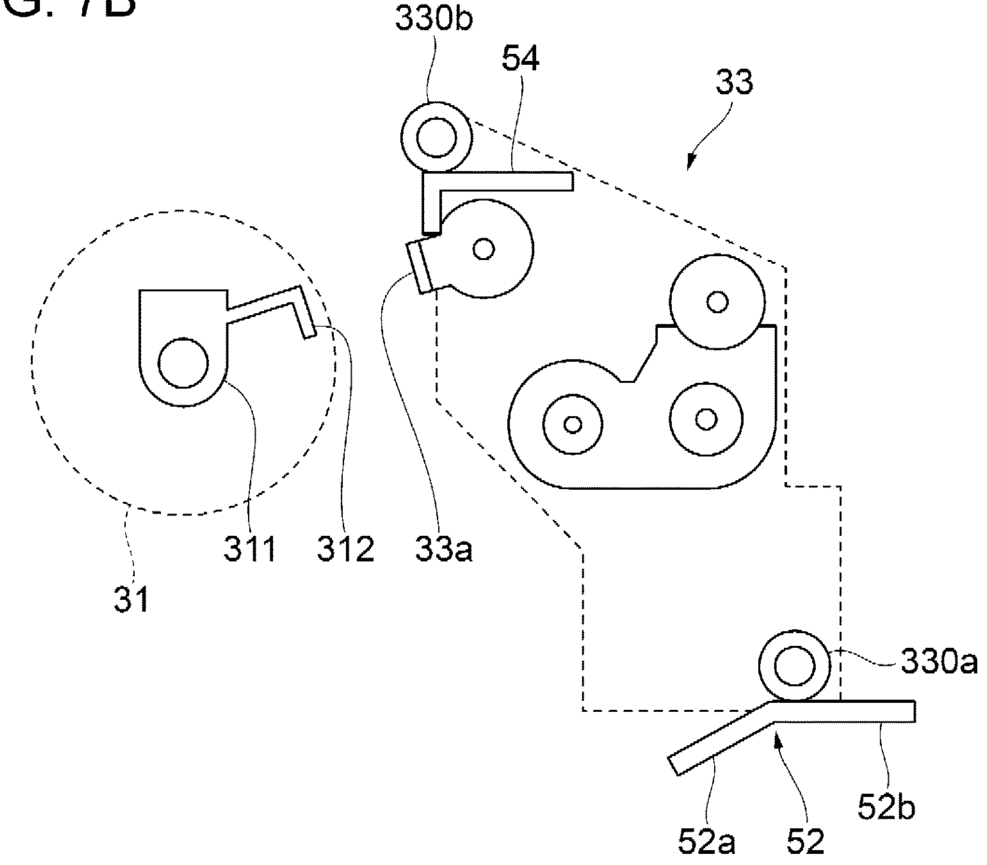
Figure 8A:
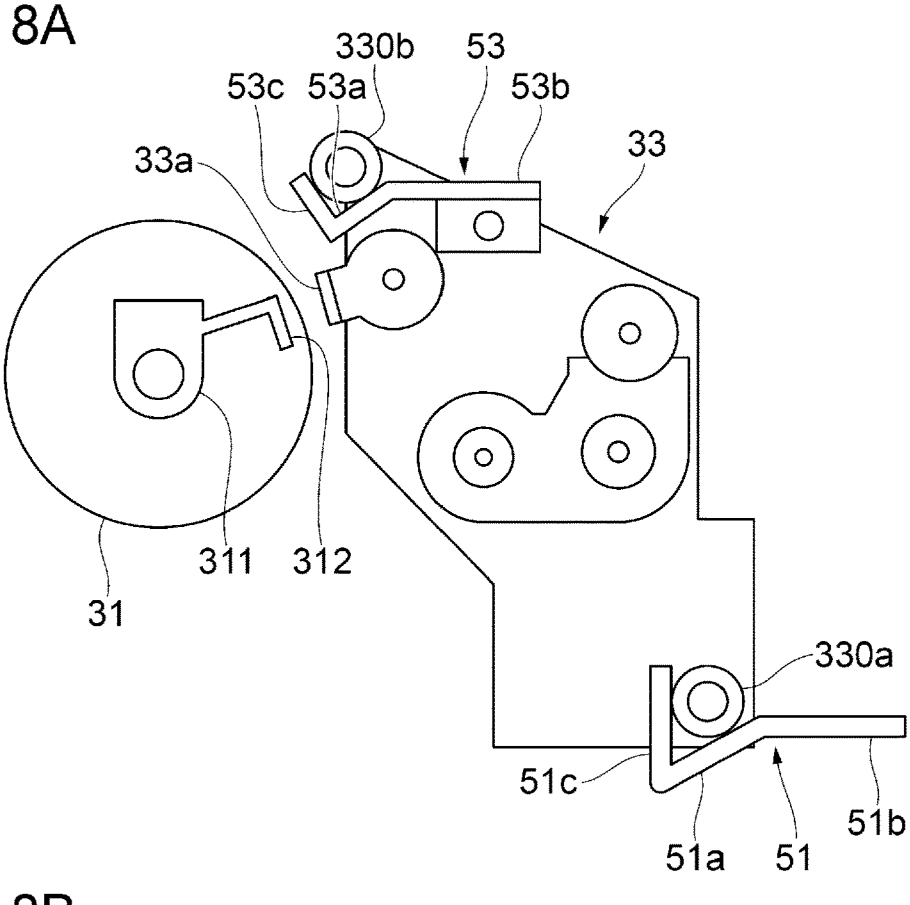
FIGS. 8A and 8B illustrate the developing member that has moved to the set position, where
Figure 8B:
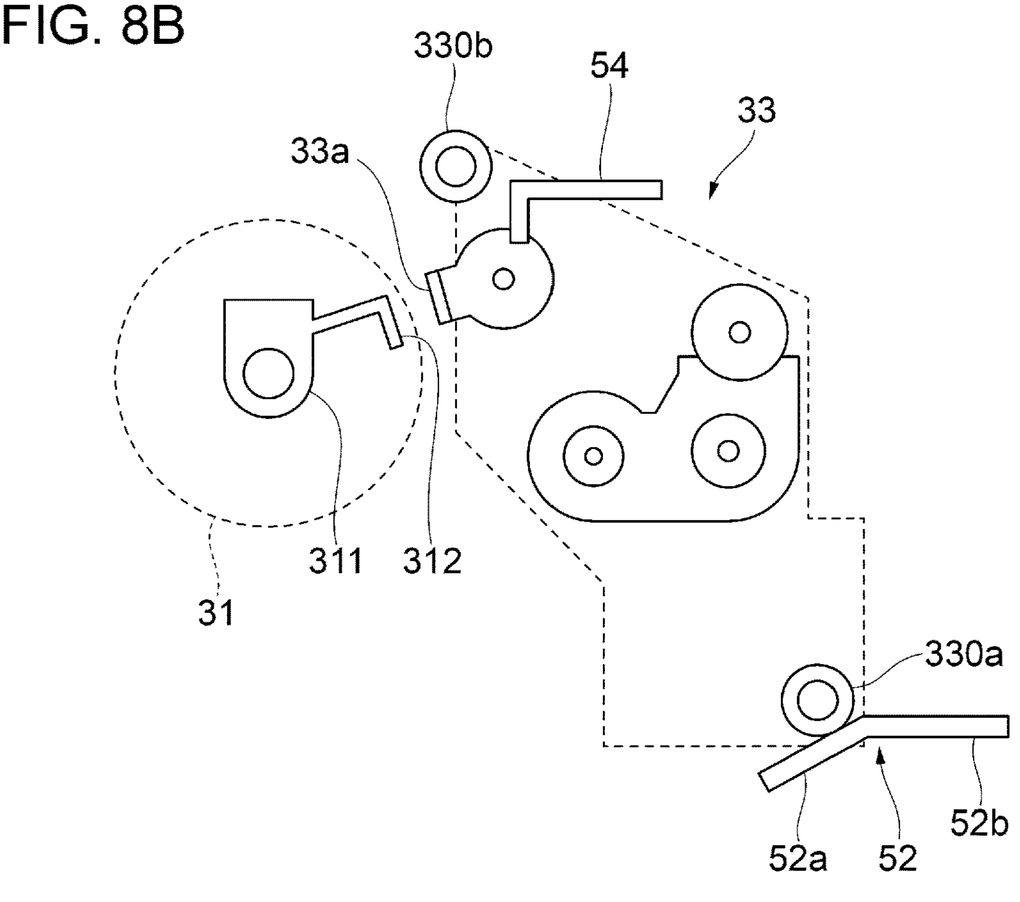
Figure 9A:
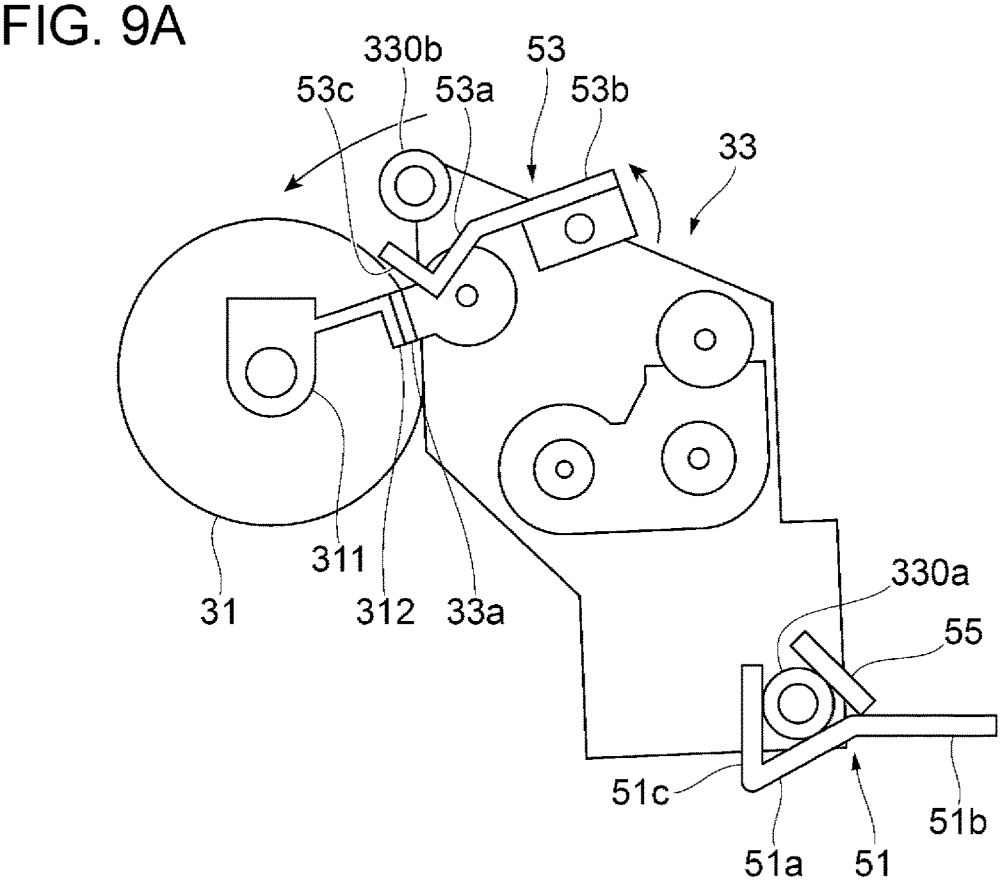
FIGS. 9A and 9B illustrate the developing member in a set state, where
Figure 9B:
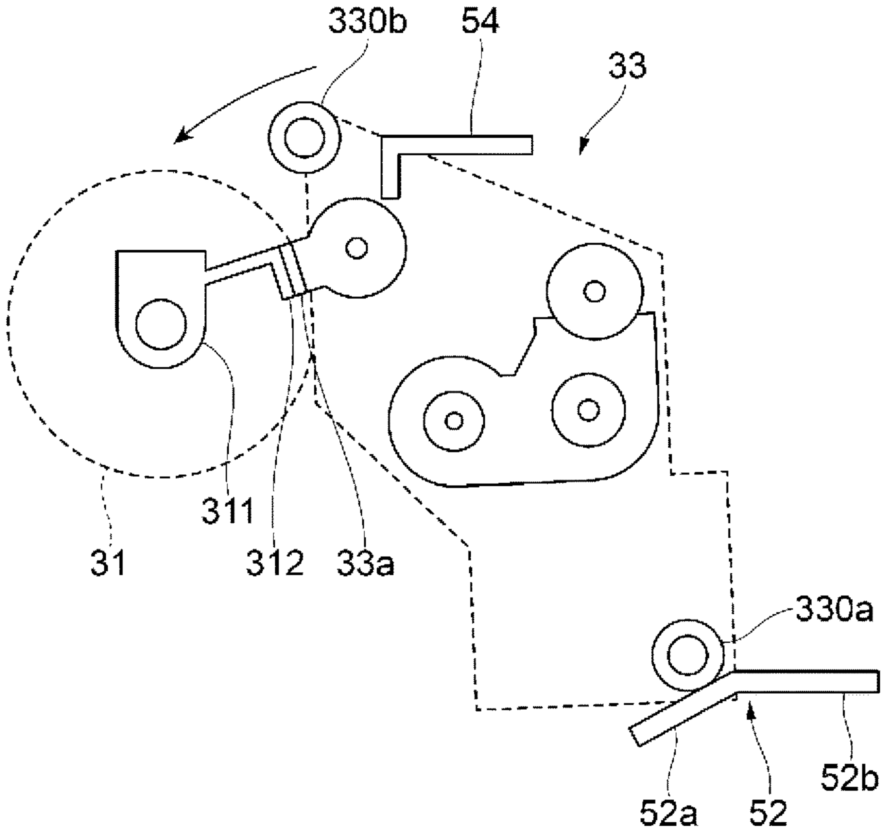

FIGS. 6A to 9B illustrate the operation of setting the developing member 33. FIGS. 6A and 6B illustrate the developing member 33 in a retracted state, where FIG. 6A illustrates the front region and FIG. 6B illustrates the rear region; FIGS. 7A and 7B illustrate the developing member 33 being moved from a retracted position to a set position, where FIG. 7A illustrates the front region and FIG. 7B illustrates the rear region; FIGS. 8A and 8B illustrate the developing member 33 that has moved to the set position, where FIG. 8A illustrates the front region and FIG. 8B illustrates the rear region; and FIGS. 9A and 9B illustrate the developing member 33 in a set state, where FIG. 9A illustrates the front region and FIG. 9B illustrates the rear region. FIGS. 6B, 7B, 8B, and 9B illustrate the rear region viewed from the front, and therefore the outer shapes of the photoconductor drum 31 and the developing member 33 are shown by imaginary lines (dashed lines).

Figure 6B:
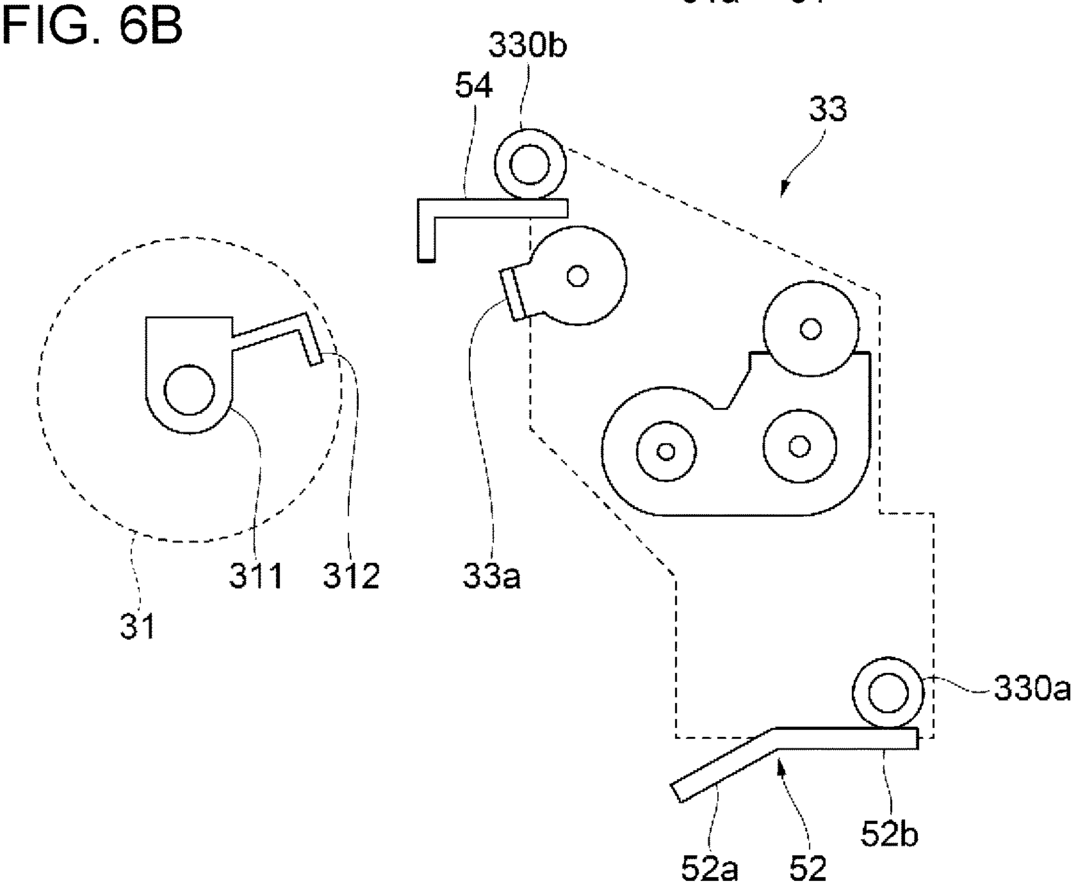

The developing member 33 is set to a retracted state when the developing member 33 is pulled out of the print unit 1B, for example, for replacement of the components or the developer. When the developing member 33 is in the retracted state, as illustrated in FIGS. 6A and 6B, the lower support roller 330*a* is placed on the retracting portion 51*b* (see FIG. 5A) of the first lower support 51 and the retracting portion 52*b* (see FIG. 5B) of the second lower support 52. The upper support roller 330*b* is placed on the retracting portion 53*b* (see FIG. 5C) of the first upper support 53 in the first state and the second upper support 54.

When the state of the developing member 33 is changed from the retracted state to the set state in which the image forming apparatus 1 is used, the developing member 33 moves from the retracted position toward the photoconductor drum 31. More specifically, as illustrated in FIGS. 7A and 7B, the lower support roller 330*a* moves along the retracting portion 51*b* toward the inclined portion 51*a* (see FIG. 5A) of the first lower support 51 and along the retracting portion 52*b* toward the inclined portion 52*a* (see FIG. 5B) of the second lower support 52. The upper support roller 330*b* moves along the retracting portion 53*b* toward the inclined portion 53*a* (see FIG. 5C) of the first upper support 53 in the first state and along the second upper support 54 toward the end adjacent to the photoconductor drum 31.

After the movement of the developing member 33 is completed, the developing member 33 is ready to be set. When the developing member 33 is ready to be set, as illustrated in FIGS. 8A and 8B, the lower support roller 330*a* is on the inclined portion 51*a* of the first lower support 51 and the inclined portion 52*a* of the second lower support 52. The upper support roller 330*b* is on the inclined portion 53*a* of the first upper support 53 in the first state, and is separated from the second upper support 54. When the developing member 33 is ready to be set, the developing member 33 is supported by the first lower support 51 and the second lower support 52, and is supported by the inclined portion 53*a* and the support tab 53*c* (see FIG. 5C) of the first upper support 53 so that the developing member 33 does not lean toward the photoconductor drum 31. As illustrated in FIG. 8B, when the developing member 33 is ready to be set, the second upper support 54 is separated from the upper support roller 330*b* and does not support the developing member 33.

When the first upper support 53 is moved from the first state to the second state while the developing member 33 is ready to be set, as illustrated in FIGS. 9A and 9B, the developing member 33 is no longer supported by the inclined portion 53*a* and the support tab 53*c* of the first upper support 53, and therefore leans toward the photoconductor drum 31. Then, the contact portion 33*a* provided on the frame 330 (see FIG. 3) of the developing member 33 comes into contact with the contact support 312 of the drum holder 311 of the photoconductor drum 31, so that the developing member 33 leaning toward the photoconductor drum 31 is supported. As illustrated in FIG. 9A, the pressing member 55 is attached to the first lower support 51 at the front, so that the lower support roller 330*a* is fixed by the inclined portion 51*a* and the abutting portion 51*c* of the first lower support 51 and the pressing member 55. Thus, the developing member 33 is positioned, and the orientation of the developing member 33 is stabilized.

Drive Mechanism

A drive mechanism for the developing member 33 will now be described. The developing member 33 includes a motor as a driving source, and transmits a driving force of the motor to the developing roller 332, the pick-up roller 333, the first transport unit 334, the second transport unit 335, and the third transport unit 336 (see FIG. 2) to supply the developer contained in the developing member 33 to the developing roller 332. The toner contained in the developer held by the developing roller 332 is used to develop an image on the photoconductor drum 31.

Figure 10:
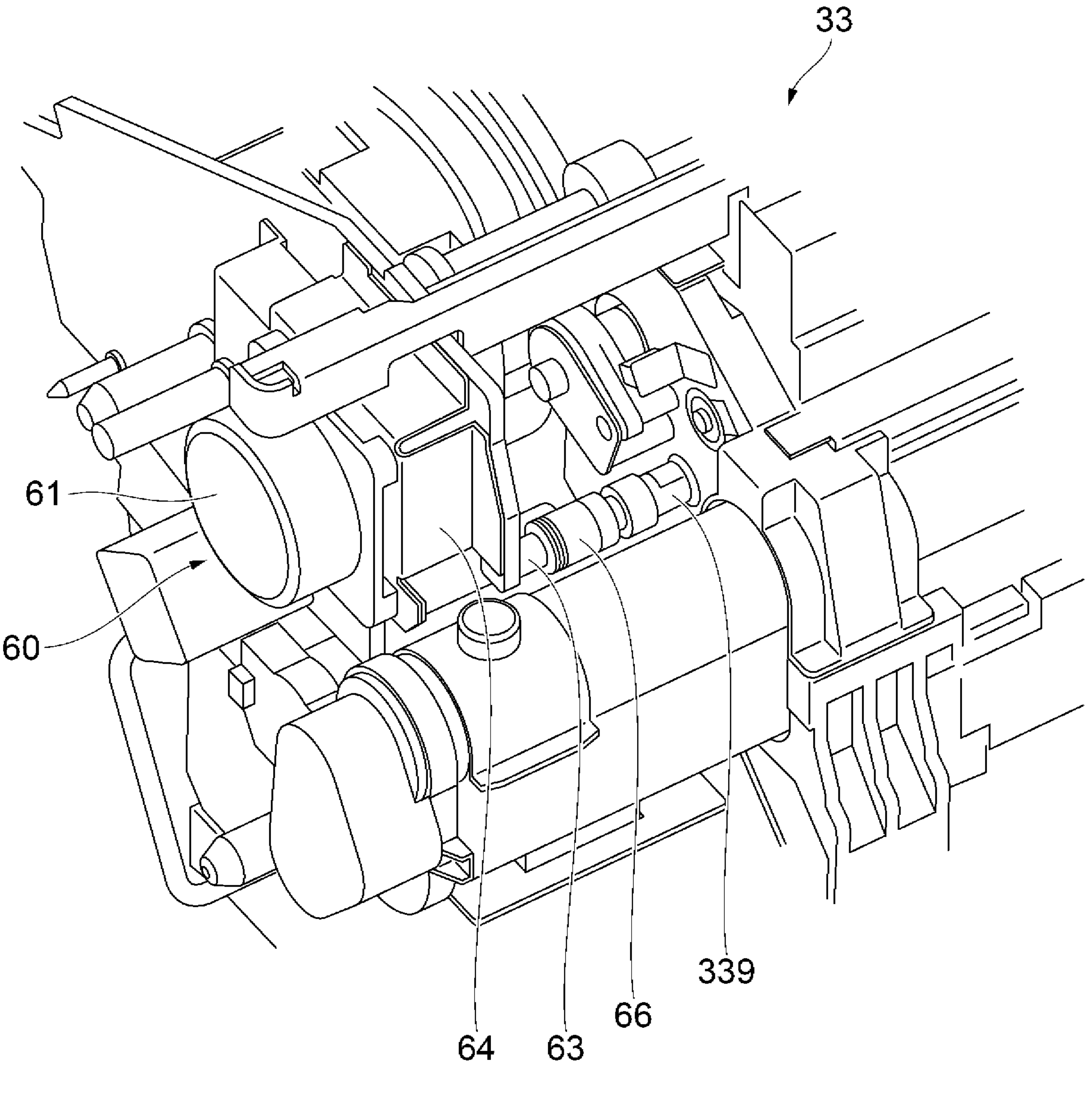
FIG. 10 illustrates a drive mechanism for the developing member.

FIG. 10 illustrates a drive mechanism for the developing member 33. The drive mechanism 60 includes a motor 61 provided on an end portion of the developing member 33 at one end (for example, front end) thereof as a driving source. The motor 61 is connected to a drive shaft 63 with gears provided therebetween. The drive shaft 63 is rotated around an axis by the motor 61, and the rotation of the drive shaft 63 is transmitted to a transmission shaft 339 of the developing member 33. The rotation of the transmission shaft 339 around an axis is distributed through gears or the like to drive the developing roller 332, the pick-up roller 333, and the first to third transport units 334 to 336. In FIG. 10, the gears between the motor 61 and the drive shaft 63 are disposed in a casing 64.

The position of an axis center of the transmission shaft 339 of the developing member 33 may vary due to individual differences and changes over time. As described above with reference to FIGS. 5A, 5B, 6A, and 6B, the lower support roller 330*a* of the developing member 33 has a portion fixed by the first lower support 51, but is positioned with a certain level of flexibility by the second lower support 52. This support structure may lead to a displacement of the position of the axis center of the transmission shaft 339. Accordingly, the drive mechanism 60 including the motor 61 is structured such that the position of the axis center of a shaft coupling 66 connecting the drive shaft 63 and the transmission shaft 339 of the developing member 33 can be changed.

Figure 11A:
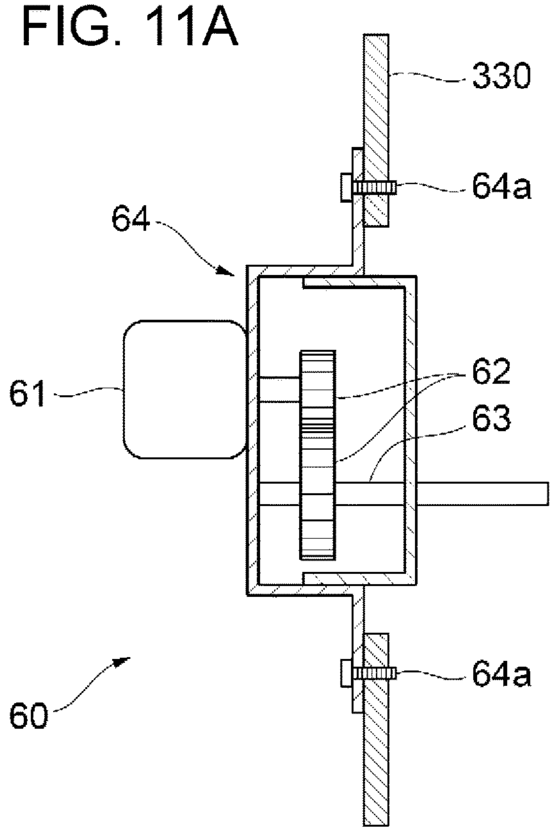
FIGS. 11A and 11B illustrate the procedure for adjusting an axis center of the drive mechanism for the developing member, where
Figure 12A:
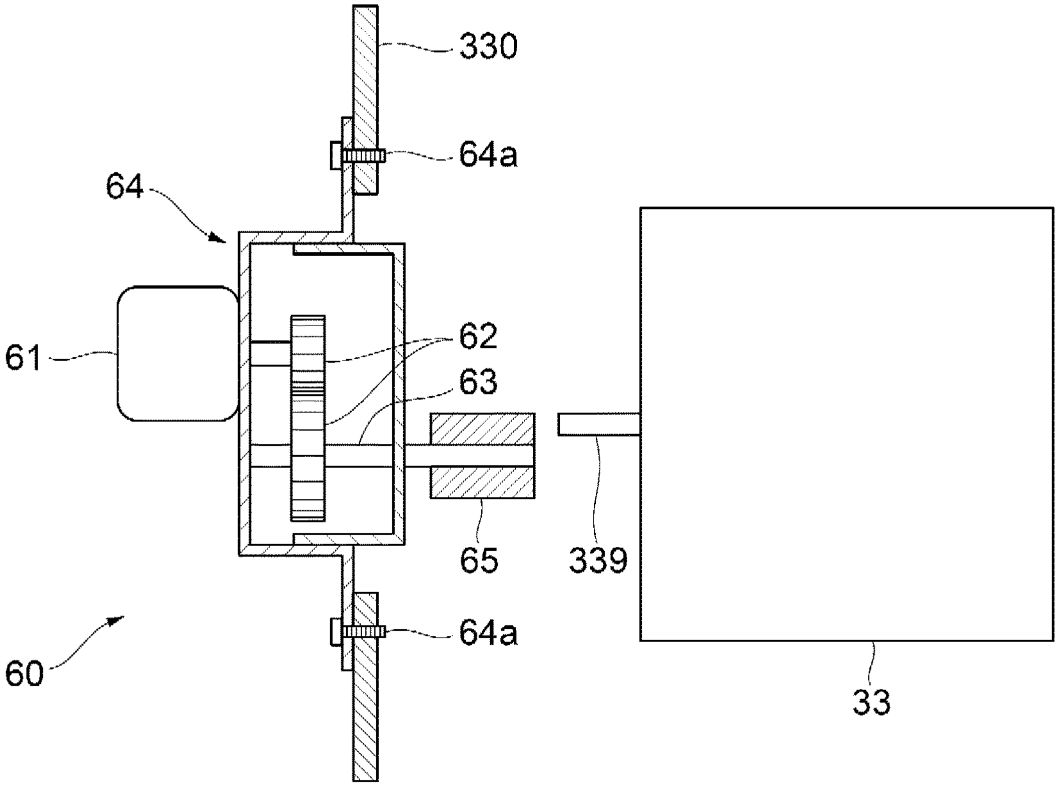
FIGS. 12A and 12B illustrate the procedure for adjusting the axis center of the drive mechanism for the developing member, where
Figure 12B:
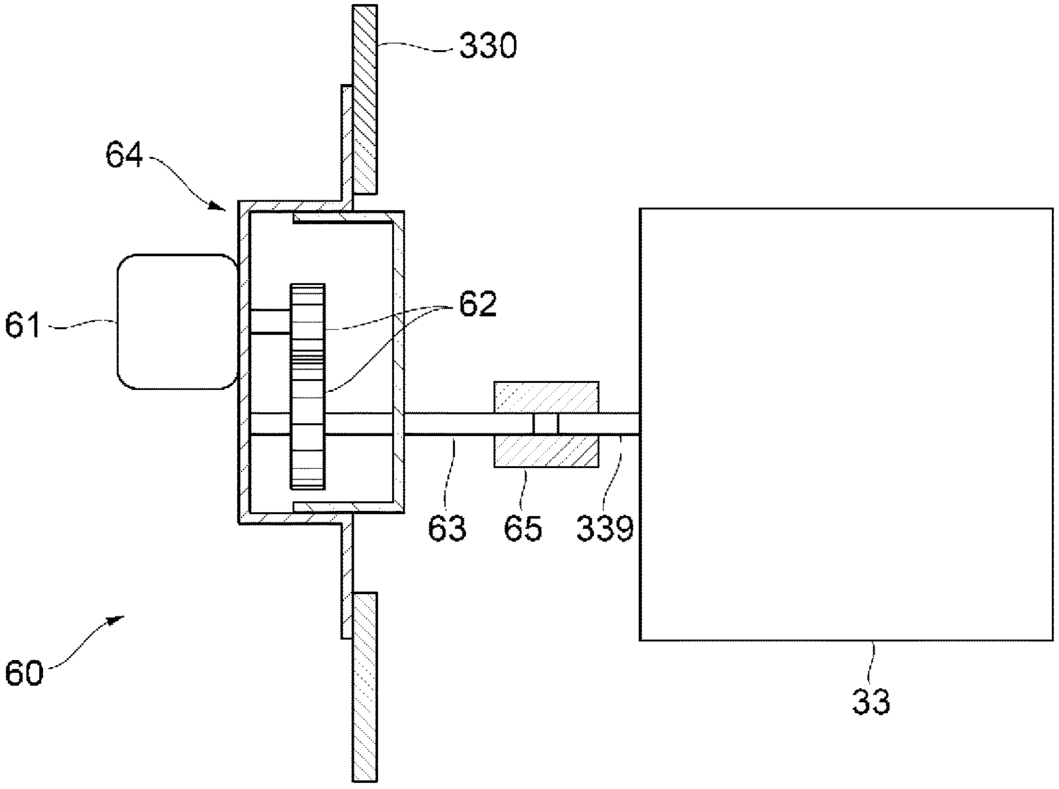
Figure 13A:
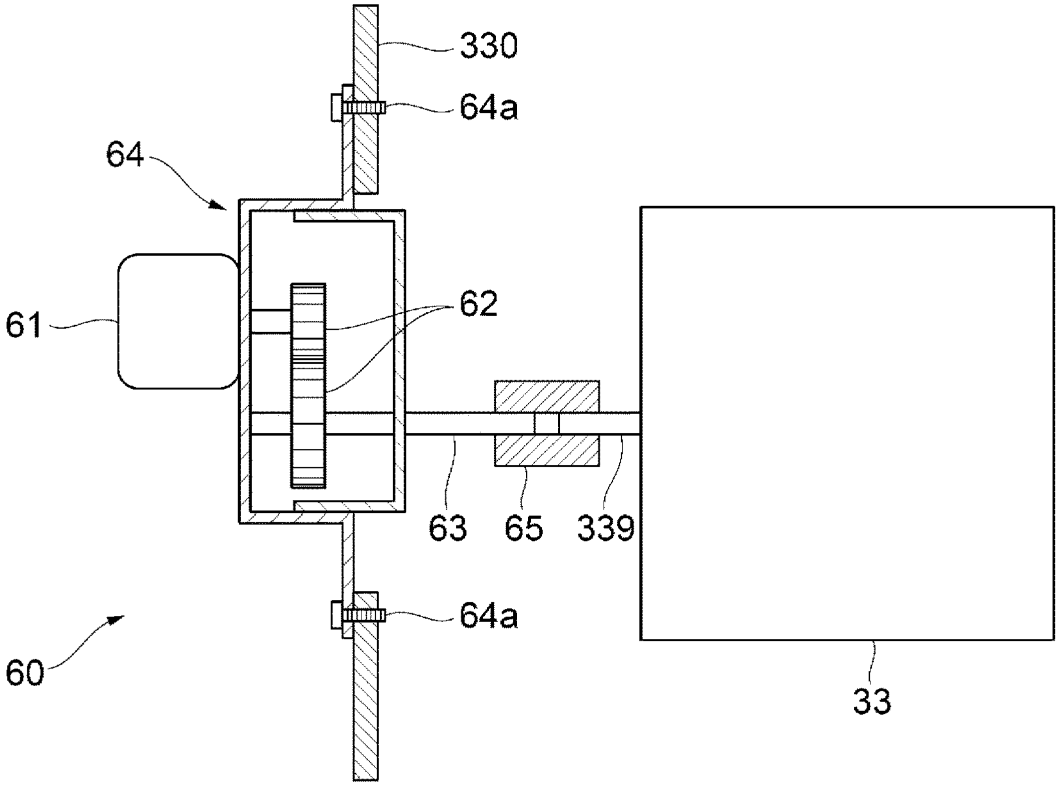
FIGS. 13A and 13B illustrate the procedure for adjusting the axis center of the drive mechanism for the developing member, where
Figure 13B:
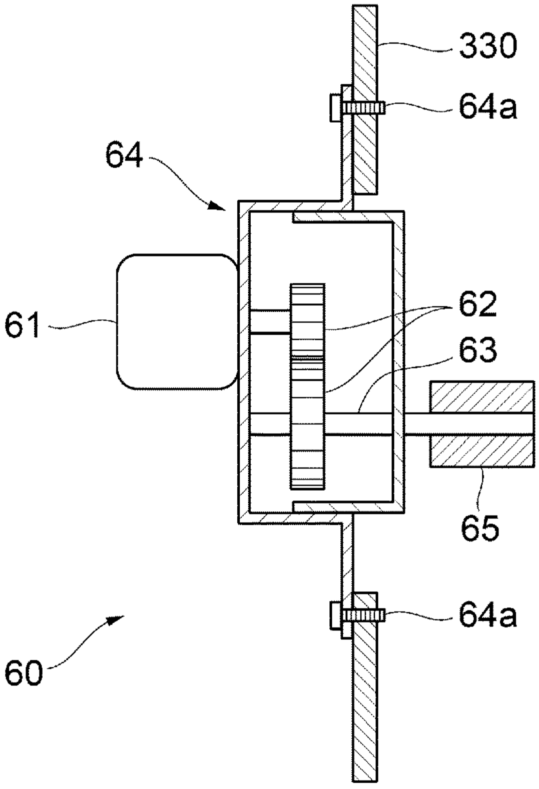
Figure 14A:
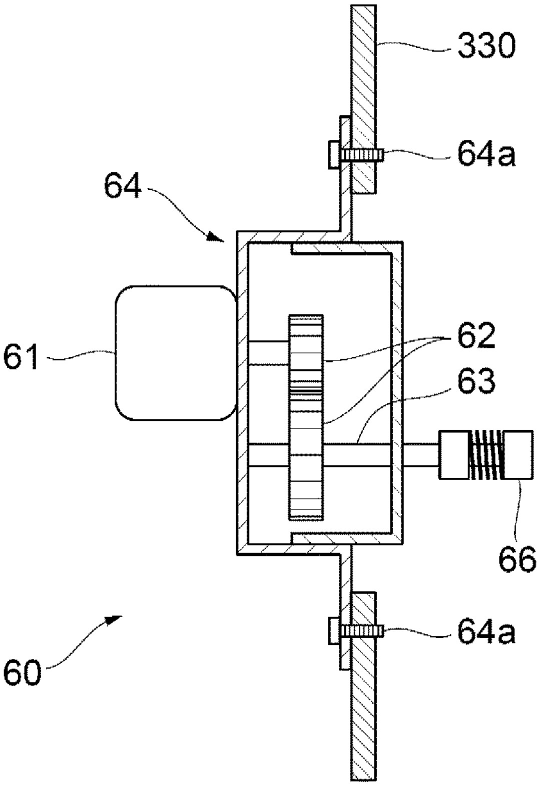
FIGS. 14A and 14B illustrate the procedure for adjusting the axis center of the drive mechanism for the developing member, where
Figure 14B:
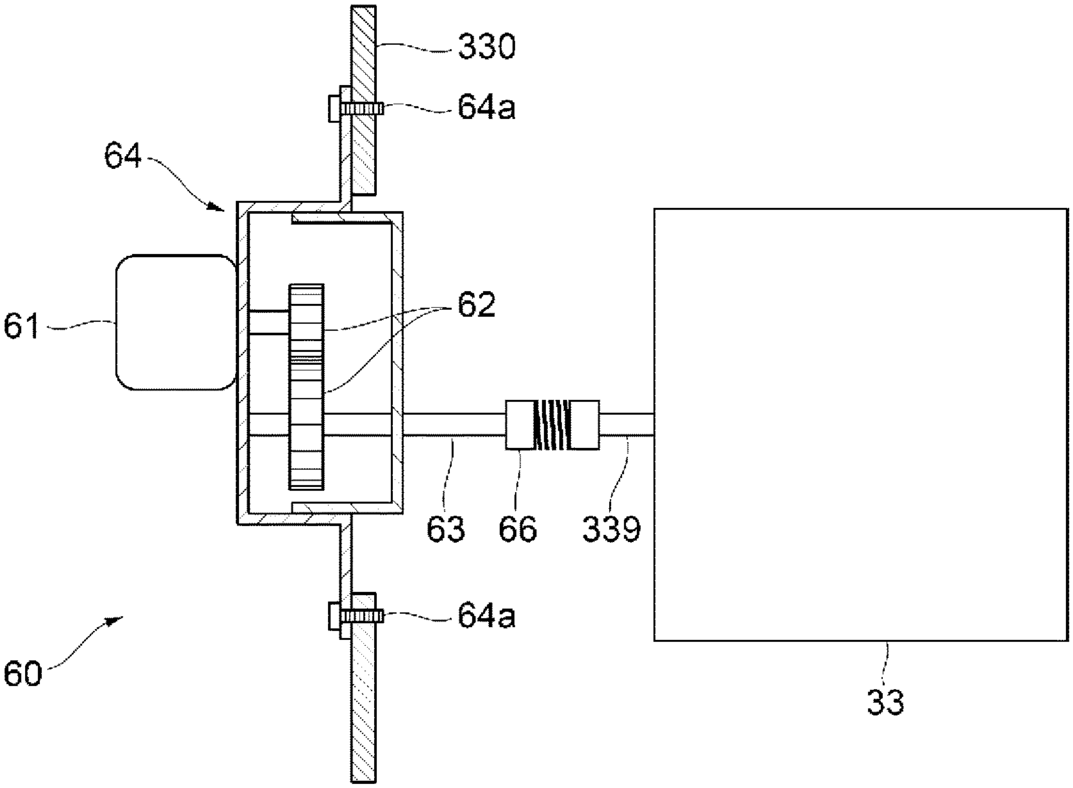

FIGS. 11A to 14B illustrate the procedure for adjusting an axis center of the drive mechanism 60 of the developing member 33. FIG. 11A illustrates a first state, and FIG. 11B illustrates a second state. FIG. 12A illustrates a third state, and FIG. 12B illustrates a fourth state. FIG. 13A illustrates a fifth state, and FIG. 13B illustrates a sixth state. FIG. 14A illustrates a seventh state, and FIG. 14B illustrates an eighth state.

As illustrated in FIG. 11A, the drive mechanism 60 includes the motor 61, gears 62 that transmit the driving force of the motor 61, and the drive shaft 63. The gears 62 and the drive shaft 63 are disposed in a casing 64, and one end of the drive shaft 63 projects from the casing 64. The rotation of a shaft of the motor 61 is transmitted to the drive shaft 63 by the gears 62. The portion of the drive shaft 63 that projects from the casing 64 rotates to supply the driving force to the outside. The casing 64 is attached to the frame 330 of the developing member 33 with screws 64*a*. Screw holes (not illustrated) in the casing 64 through which the screws 64*a* are inserted are, for example, long holes, and the position of the casing 64 relative to the frame 330 can be adjusted by changing the positions at which the screws 64*a* are fastened in the screw holes.

Figure 11B:
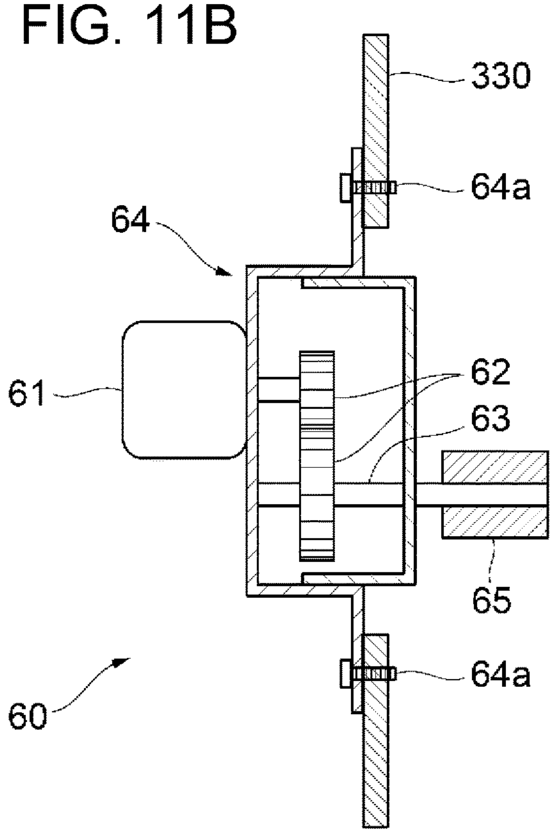

To adjust the axis center of the drive mechanism 60 (that is, the position of the axis of the drive shaft 63), first, an adjustment jig 65 is attached to the portion of the drive shaft 63 that projects from the casing 64, as illustrated in FIG. 11B. The adjustment jig 65 is a tubular jig made of, for example, a metal. Next, as illustrated in FIGS. 12A and 12B, the drive shaft 63 of the drive mechanism 60 to which the adjustment jig 65 is attached is aligned with the transmission shaft 339 of the developing member 33. In the state illustrated in FIG. 12A, the drive shaft 63 and the transmission shaft 339 are displaced from each other. Accordingly, the screws 64*a* are removed and the casing 64 is shifted to align the drive shaft 63 with the transmission shaft 339, as illustrated in FIG. 12B. Then, the adjustment jig 65 of the drive shaft 63 is slid so that the adjustment jig 65 covers the drive shaft 63 and the transmission shaft 339.

Next, as illustrated in FIG. 13A, the casing 64 is fixed to the frame 330 of the developing member 33 with the screws 64*a* while the drive shaft 63 and the transmission shaft 339 are aligned by the adjustment jig 65. After the casing 64 is fixed, the transmission shaft 339 of the developing member 33 is removed from the adjustment jig 65, as illustrated in FIG. 13B. Then, as illustrated in FIG. 14A, the adjustment jig 65 is removed from the drive shaft 63, and the shaft coupling 66 is attached to the drive shaft 63 instead. Then, the transmission shaft 339 of the developing member 33 is attached to an end of the shaft coupling 66 opposite to an end to which the drive shaft 63 is attached. As a result of the above-described process, the axis centers of the drive shaft 63 of the drive mechanism 60 and the transmission shaft 339 of the developing member 33 are adjusted, and the drive shaft 63 and the transmission shaft 339 are connected to each other by the shaft coupling 66.

While an exemplary embodiment of the present disclosure has been described, the technical scope of the present disclosure is not limited to the above-described exemplary embodiment. The present disclosure includes various modifications and structural replacements made without departing from the technical scope of the present disclosure. The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A developing device including:

an image carrier unit including an image carrier;

a developing unit including a developer holder that supplies developer to the image carrier on which an electrostatic latent image is formed;

a support unit that supports the developing unit such that the developing unit is movable back and forth toward and away from the image carrier unit;

a first positioning unit provided on an end portion of the support unit, the end portion being adjacent to the image carrier unit, the first positioning unit positioning the developing unit; and a second positioning unit that positions the developing unit with a predetermined gap provided between the developer holder and the image carrier when the developing unit is positioned by the first positioning unit and leans toward the image carrier unit.

(((2)))

The developing device according to (((1))), wherein the support unit includes a guide path that guides the developing unit, and wherein the first positioning unit is structured such that the guide path includes an end portion inclined downward toward the image carrier unit, the first positioning unit including an abutting portion against which the developing unit is abutted at a location at which the guide path is inclined.

(((3)))

The developing device according to (((1))) or (((2))), wherein the first positioning unit further includes a pressing member that restrains movement of the developing unit when the developing unit is abutted against the abutting portion.

(((4)))

The developing device according to (((2))) or (((3))), wherein the guide path of the support unit includes two rails disposed parallel to each other and extending in a direction in which the developing unit moves back and forth, and wherein the first positioning unit is structured such that each of the two rails includes an end portion that is inclined, and the abutting portion is provided on the end portion of one of the two rails.

(((5)))

The developing device according to (((4))), wherein the developing unit is not fixed on one of the two rails of the first positioning unit that is not provided with the abutting portion.

(((6)))

The developing device according to any one of (((1))) to (((5))), wherein the support unit includes:

a lower guide path that supports and guides a lower portion of the developing unit and includes the first positioning unit; and an upper guide path that supports and guides an upper portion of the developing unit, and wherein the developing unit is separated from the upper guide path and leans toward the image carrier unit when the developing unit is positioned by the first positioning unit of the lower guide path.

(((7)))

The developing device according to (((6))), wherein the upper guide path of the support unit is switchable between a contact state in which the upper guide path supports the developing unit and a retracted state in which the upper guide path is separated from the developing unit at least when the developing unit is positioned by the first positioning unit of the lower guide path.

(((8)))

The developing device according to (((7))), wherein the upper guide path of the support unit includes two rails disposed parallel to each other and extending in a direction in which the developing unit moves back and forth, wherein one of the two rails of the upper guide path is switchable between the contact state and the retracted state, and wherein another one of the two rails of the upper guide path is shorter than a distance by which the developing unit moves and is not in contact with the developing unit when the developing unit is positioned by the first positioning unit of the lower guide path.

(((9)))

The developing device according to any one of (((1))) to (((8))), further including:

a drive mechanism that rotates a drive shaft of the developing unit to transmit a driving force to the developing unit, wherein the drive mechanism is capable of changing a position of an axis center of a coupling portion that is connected to the drive shaft and that rotates the drive shaft.

(((10)))

An image forming apparatus including the developing device according to any one of (((1))) to (((9))).

What is claimed is:

1. A developing device comprising:

an image carrier unit including an image carrier;

a developing unit including a developer holder that supplies developer to the image carrier on which an electrostatic latent image is formed;

a support unit that supports the developing unit such that the developing unit is movable back and forth toward and away from the image carrier unit;

a first positioning unit provided on an end portion of the support unit, the end portion being adjacent to the image carrier unit, the first positioning unit positioning the developing unit; and a second positioning unit that positions the developing unit with a predetermined gap provided between the developer holder and the image carrier when the developing unit is positioned by the first positioning unit and leans toward the image carrier unit.

2. The developing device according to claim 1, wherein the support unit includes a guide path that guides the developing unit, and wherein the first positioning unit is structured such that the guide path includes an end portion inclined downward toward the image carrier unit, the first positioning unit including an abutting portion against which the developing unit is abutted at a location at which the guide path is inclined.

3. The developing device according to claim 2, wherein the first positioning unit further includes a pressing member that restrains movement of the developing unit when the developing unit is abutted against the abutting portion.

4. An image forming apparatus comprising:

the developing device according to claim 3.

5. The developing device according to claim 2, wherein the guide path of the support unit includes two rails disposed parallel to each other and extending in a direction in which the developing unit moves back and forth, and wherein the first positioning unit is structured such that each of the two rails includes an end portion that is inclined, and the abutting portion is provided on the end portion of one of the two rails.

6. The developing device according to claim 2, wherein the developing unit is not fixed on one of the two rails of the first positioning unit that is not provided with the abutting portion.

7. An image forming apparatus comprising:

the developing device according to claim 6.

8. An image forming apparatus comprising:

the developing device according to claim 5.

9. An image forming apparatus comprising:
the developing device according to claim 2.

10. The developing device according to claim 1,
wherein the support unit includes:
a lower guide path that supports and guides a lower portion of the developing unit and includes the first positioning unit; and
an upper guide path that supports and guides an upper portion of the developing unit, and
wherein the developing unit is separated from the upper guide path and leans toward the image carrier unit when the developing unit is positioned by the first positioning unit of the lower guide path.

11. The developing device according to claim 10,
wherein the upper guide path of the support unit is switchable between a contact state in which the upper guide path supports the developing unit and a retracted state in which the upper guide path is separated from the developing unit at least when the developing unit is positioned by the first positioning unit of the lower guide path.

12. The developing device according to claim 11,
wherein the upper guide path of the support unit includes two rails disposed parallel to each other and extending in a direction in which the developing unit moves back and forth,
wherein one of the two rails of the upper guide path is switchable between the contact state and the retracted state, and
wherein another one of the two rails of the upper guide path is shorter than a distance by which the developing unit moves and is not in contact with the developing unit when the developing unit is positioned by the first positioning unit of the lower guide path.

13. An image forming apparatus comprising:
the developing device according to claim 12.

14. An image forming apparatus comprising:
the developing device according to claim 11.

15. An image forming apparatus comprising:
the developing device according to claim 10.

16. The developing device according to claim 1, further comprising:
a drive mechanism that rotates a drive shaft of the developing unit to transmit a driving force to the developing unit,
wherein the drive mechanism is capable of changing a position of an axis center of a coupling portion that is connected to the drive shaft and that rotates the drive shaft.

17. An image forming apparatus comprising:
the developing device according to claim 16.

18. An image forming apparatus comprising:
the developing device according to claim 1.

* * * * *